RAIL JOINT FOR LOCOMOTIVE TURNTABLES

Filed Dec. 30, 1946 4 Sheets-Sheet 1

Inventor
William A. Summerhays
by Parker & Carter
Attorneys

RAIL JOINT FOR LOCOMOTIVE TURNTABLES

Filed Dec. 30, 1946 4 Sheets-Sheet 2

Inventor
William A. Summerhays
by Parker & Carter
Attorneys.

April 15, 1952 W. A. SUMMERHAYS 2,593,215

RAIL JOINT FOR LOCOMOTIVE TURNTABLES

Filed Dec. 30, 1946 4 Sheets-Sheet 3

Inventor
William A. Summerhays
by Parker & Carter
Attorneys

RAIL JOINT FOR LOCOMOTIVE TURNTABLES

Filed Dec. 30, 1946 4 Sheets-Sheet 4

Inventor
William A. Summerhays
by Parker & Carter
Attorneys

Patented Apr. 15, 1952 2,593,215

UNITED STATES PATENT OFFICE 2,593,215

RAIL JOINT FOR LOCOMOTIVE TURNTABLES

William A. Summerhays, Chicago, Ill., assignor to Conley Frog and Switch Co., Memphis, Tenn., a corporation of West Virginia Application December 30, 1946, Serial No. 719,208

6 Claims. (Cl. 104—47)

My invention relates to improvements in joints for locomotive turntables and the like and has for one object to provide a new and improved connection between the track on the turntable and the tracks leading into the various stalls in a roundhouse or any other tracks terminating at the locomotive turntable.

Railroad roundhouses have a large number of stalls—forty, fifty or one hundred sometimes, with a track leading into each stall. A turntable rotates in a pit with a single track which may be brought into register selectively with any of the tracks terminating at the periphery of the pit.

It is of the utmost importance to insure correct and positive alignment of the turntable track with the fixed tracks on the ground. It is also important that the wheel load of the locomotive as it passes to or from the turntable track be cushioned and eased to avoid the shock which otherwise results from the wheels passing directly and without support across the gap which of necessity exists between the abutting ends of the turntable track and the ground track. I propose, therefore, to associate with the turntable track, a joint which will at the same time serve to positively align tracks and bridge the gap between them so that the locomotive may smoothly and quietly pass from one to the other.

Other objects will appear from time to time throughout the specification and claims.

My invention is illustrated more or less diagrammatically in the accompanying drawings, wherein.

Figure 1:
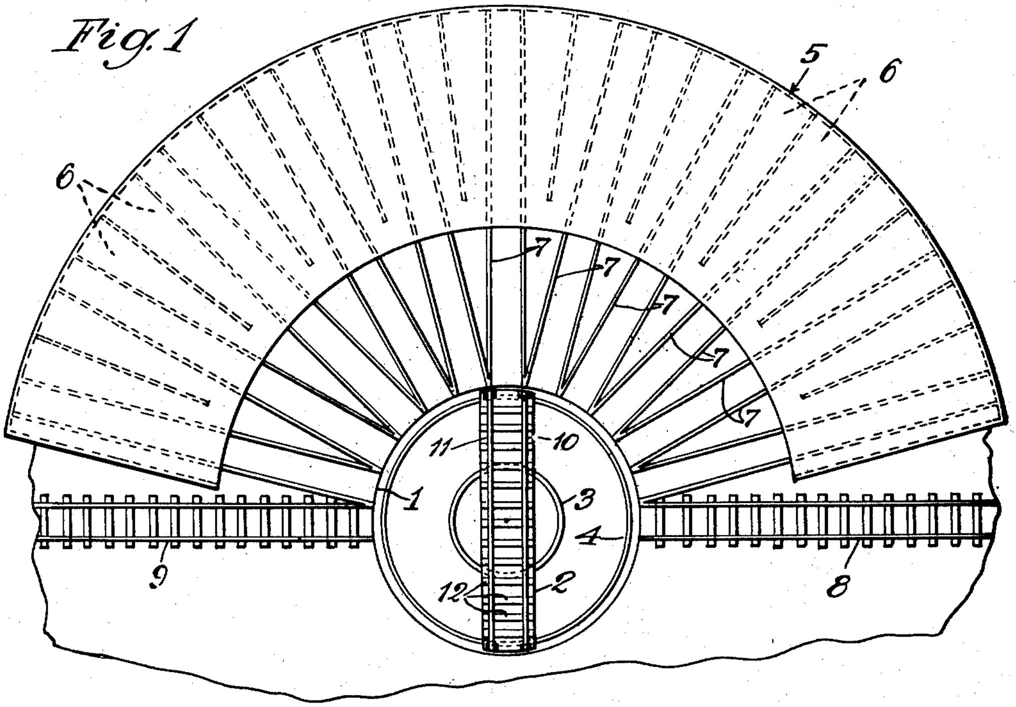
Figure 1 is a plan view of a roundhouse and locomotive turntable.
Figures 9, 10:
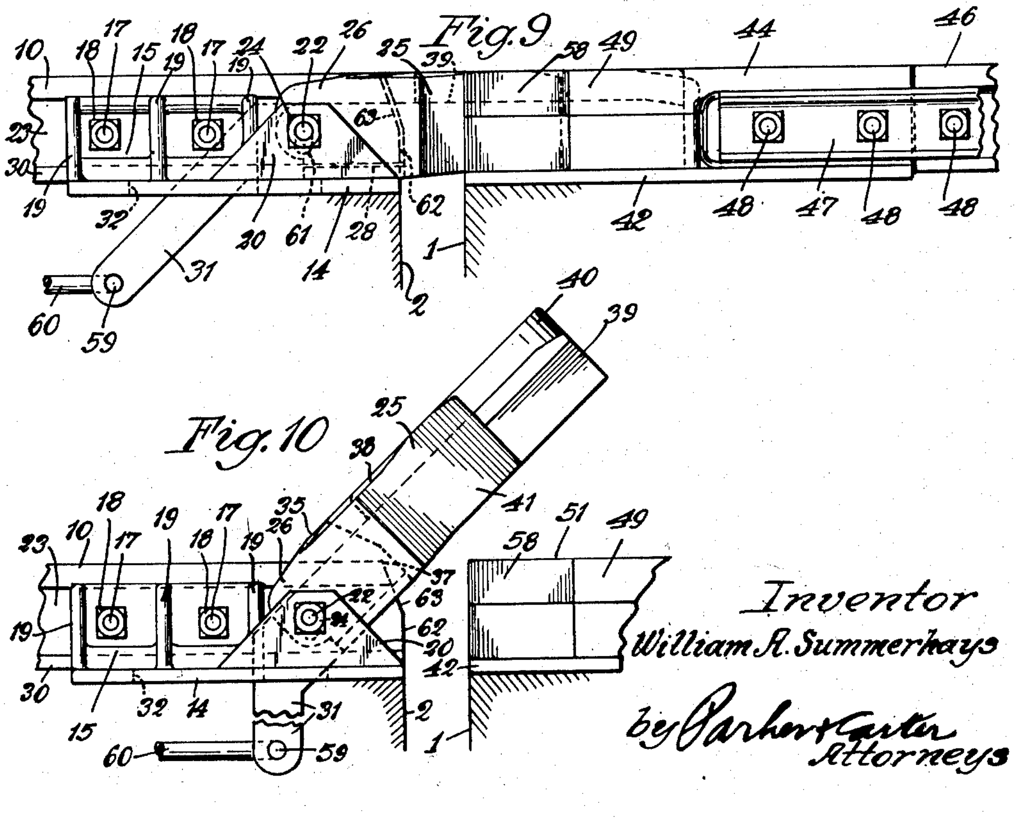
Figure 2:
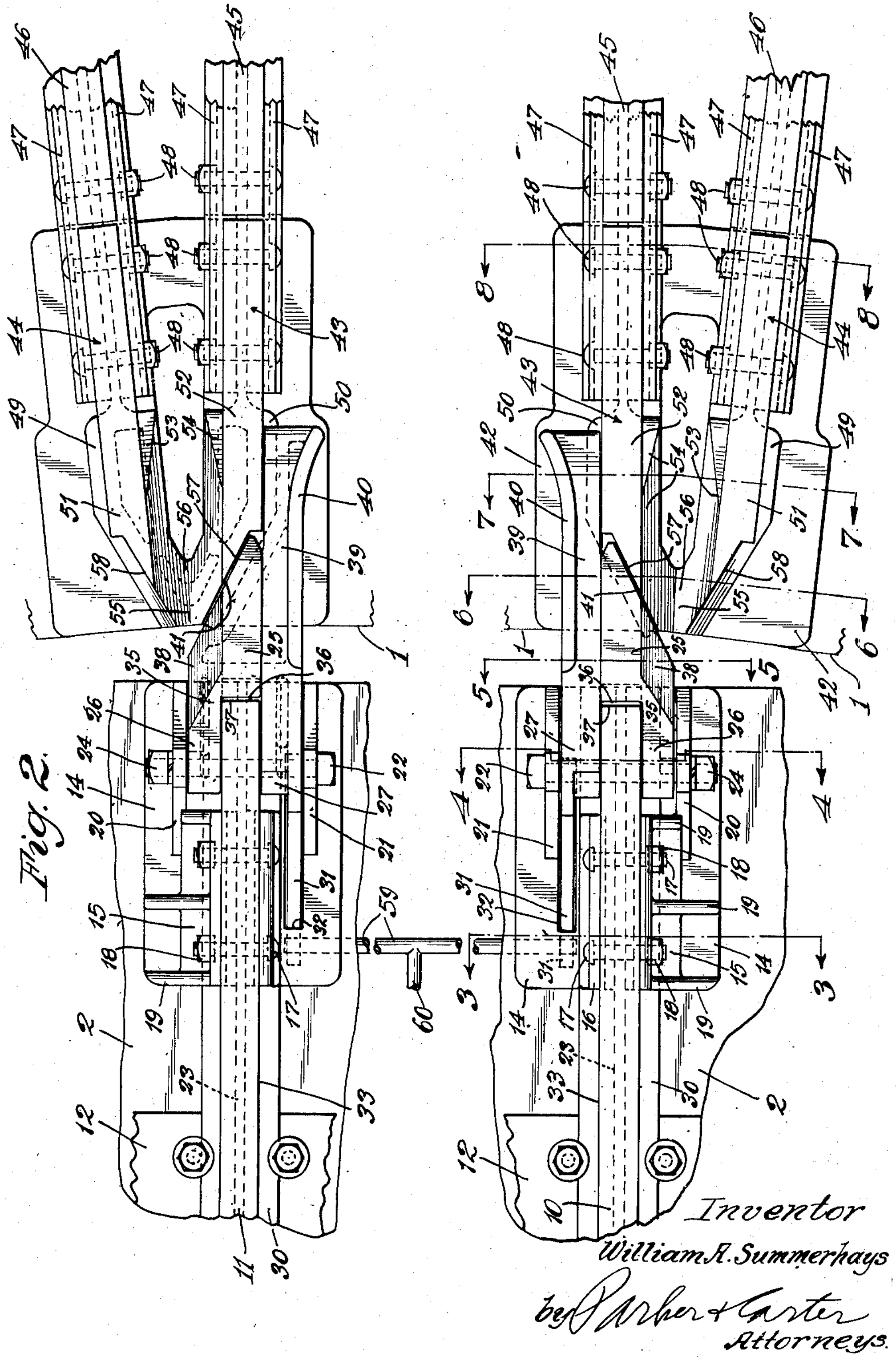
Figure 2 is a part plan view on an enlarged scale.
Figure 3:
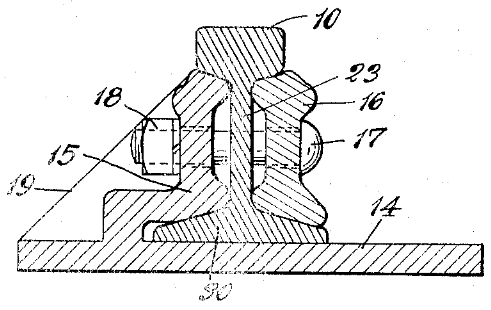
Figure 4:
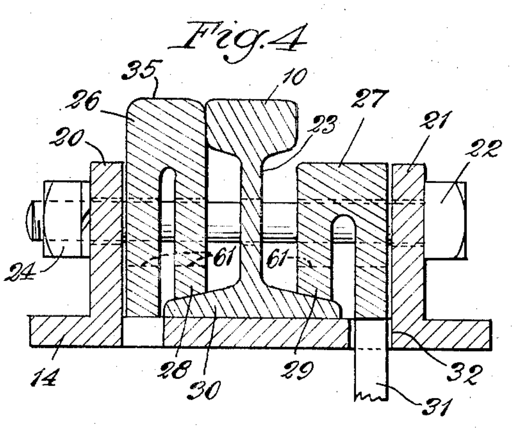
Figure 5:
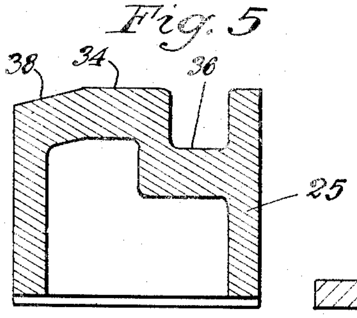
Figure 6:
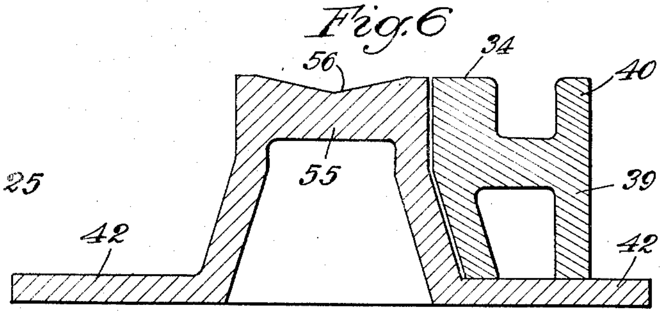
Figure 7:
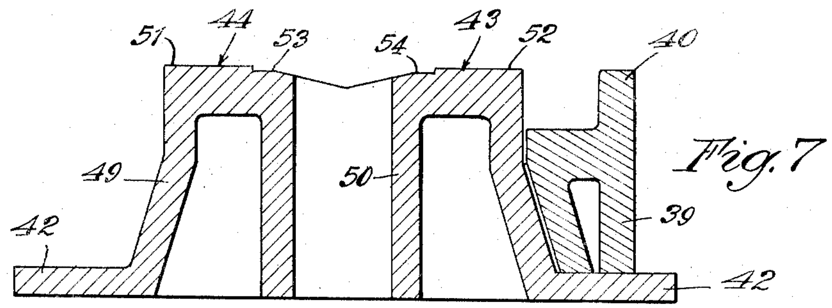
Figure 8:
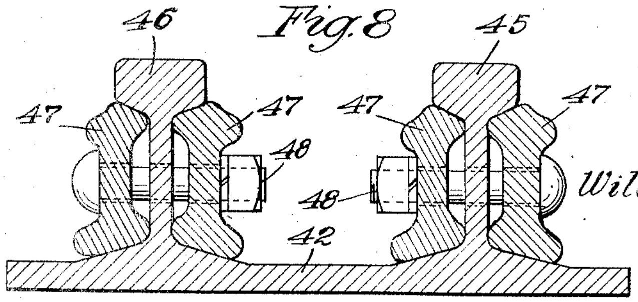
Figure 11:
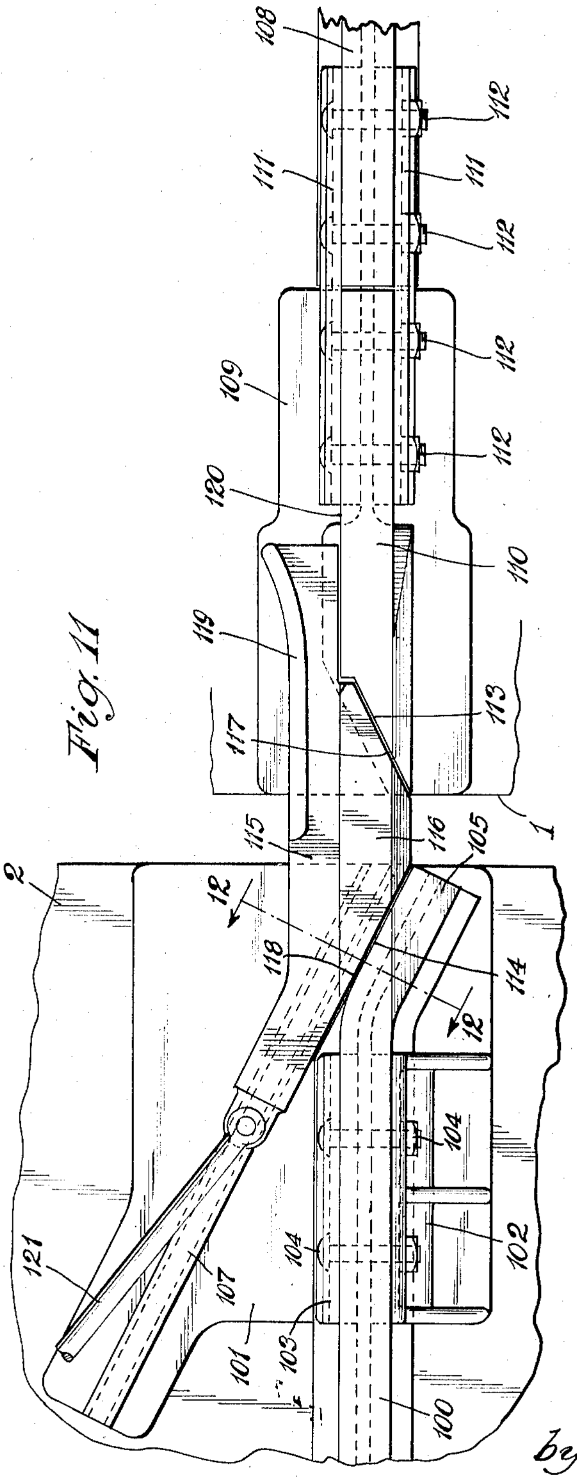
Figure 12:
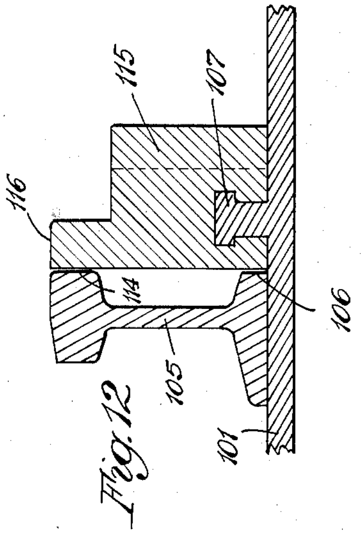

Figure 3 is a section on the line 3—3 of Fig. 2;
Figure 4 is a section on the line 4—4 of Fig. 2;
Figure 5 is a section on the line 5—5 of Fig. 2;
Figure 6 is a section on the line 6—6 of Fig. 2;
Figure 7 is a section on the line 7—7 of Fig. 2;
Figure 8 is a section on the line 8—8 of Fig. 2;
Figure 9 is a side elevation of Figure 2;
Figure 10 is a fragmentary side view of Fig. 9;
Figure 11 is a plan view of a modified form; and
Figure 12 is a section on line 12—12 of Fig. 11.

Like parts are indicated by like characters throughout the specification and drawings.

1 is a locomotive turntable pit. 2 is a turntable which rotates on wheels traveling along two concentric tracks, track 3 adjacent the center of the pit, track 4 adjacent its outer periphery. 5 is a roundhouse, having stalls 6, there being a ground track 7 leading from each stall to the pit, these tracks are radially disposed about the center of rotation of the turntable, and converge so that at the edge of the pit, the rails of adjacent tracks almost intersect. 8 is the incoming track by which a locomotive comes into the turntable, 9 the outgoing track by which the locomotive leaves the turntable. Cinder pit, coaling station, water pipes, etc., which are usual roundhouse equipment form no part of the present invention and are not here illustrated. The above is the usual conventional layout for a roundhouse locomotive turntable. The roundhouse may go all the way around or only part way around. There may be few or many tracks and the above disclosure is merely for the purpose of orienting my invention in the roundhouse turntable assembly which is more specifically illustrated in Figures 2 to 10.

Mounted on the turntable 2 are two parallel rails 10, 11, forming the turntable track. They are carried on ties 12 and are spiked or bolted in place in the usual manner. Each of these two rails 10 and 11 terminate short of the end of the turntable and rest on a turntable track plate 14, being held in position thereon by the integral angle bars 15 removable tie bars 16, bolts 17 and nuts 18, the angle bar 15 having a series of struts 19 integral with it and with the plate 14. There are four of these assemblies, one associated with each end of rails 10 and 11.

Projecting upwardly from the track plate 14 on both sides of the rail are integral ears 20 and 21. A pivot bolt 22 passes through the ears 20 and 21 and through the web 23 of the rail, being held in position by the nut 24. Pivoted on the bolt 22 is a joint or frog 25 having at its inner end fork members 26 and 27, one on each side of the rail and apertured to permit passage of the bolt 22. These fork members 26 and 27 have extensions 28, 29 resting on the rail flange 30 when in the closed position. A lever 31 extends downwardly through an aperture 32 in the track plate 14. The fork member 26 extends upwardly beside the rail to provide a wheel bearing surface level with the top thereof. The fork member 27 is sufficiently below the rail to provide clearance for the wheel flange as it travels along the gauge line 33.

The joint 25 where it bridges the gap between the end of the turntable and the edge of the pit is hollow as indicated in Figure 5. When in the closed position, the joint bearing surface 34 in alignment with the track rail is at the same level as the top of the rail. The bearing surface 35 on the fork arm 26, as shown in Figure 4, comes up to the same level as the top of the rail and continues toward the edge of the pit beyond the gap 36 between the end of rail 37 and the base of the U between the arms 26 and 27. The purpose of this is to permit the wheel where it extends beyond the rail to be supported as it passes over the gap 36 by the bearing surface 35. The surface 35 blends into the clearance surface 38 at one side of the frog bearing surface 34 as indicated especially in Figure 5.

The joint 25 has an extension 39 in alignment with the fork member 27 adapted to extend well beyond the edge of the pit away from the turntable. This extension has the upwardly extending rib 40 defining a channel between it and the gauge line 33 to provide clearance for the wheel flange. The bearing surface 34 on the joint extends at rail height to the diagonal terminal plane 41 and the joint 25 and its extension 39 when in the closed position rest upon the ground track plate 42 at the edge of the pit.

The two rails 43 and 44 converge as indicated in Figure 2, terminating at the inner end of the ground track plate 42 and are held in alignment with rail sections 45, 46 integral with the plate 42 by tie bars 47 and bolts 48 in the usual manner. The rail sections 45 and 46 continue to converge toward the edge of the pit. The shape of the rail sections 45 and 46 integral with the plate 42 changes as indicated in Figure 7 to two inverted U-shaped elements 49 and 50 still integral with the plate 42. Each of these elements has a track surface 51, 52 at the same level as the surface of the rail sections 45 and 46 with clearance surfaces 53 and 54 between them. Then as shown in Figure 6, two members 49 and 50 come together to form a larger inverted U-shaped section 55 which has no wheel supporting surface but is cut away as at 56 for clearance. This member 55 is bounded by two diagonal vertical surfaces 57, 58, the surface 57 conforming to and adapted to be engaged by the terminal plane surface 41 on the joint 25.

The structure above described has been directed to the joint associated with track rail 10. A complementary structure is associated with track rail 11 except that the joint and its associated parts are reversed. 59 is a tie rod joining the two levers 31. 60 is a connecting rod which may be operated by any suitable source of power to cause the tie rod 59 to move the levers 31 to open and close the joints. Movement of the levers 31 in a counter clockwise direction will rotate the joints out of engagement with the rail plate 42 and permit rotation of the turntable. When the turntable is spotted in line with a selected track, rotation of the levers 31 in a clockwise direction will cause the two joints to interlock the inclined surfaces on the ground rail plates so that the two opposed pairs of inclined surfaces lock the turntable in correct alignment with the selected track.

To compensate for local inaccuracies and variations in level of the ground carrying the track rails at the edge of the pit and the turntable itself, the holes in the fork members 26 and 27 are as indicated at 61 especially in Figure 9, oval. Thus the joint itself when in the closed position is supported by the plates 14 and 42 and not carried by the pin or bolt 22. Thus distortion of parts and undue straining of the bolt is avoided because the bolt merely acts as a pivot to support the joint as the joint is being raised.

Referring now to Figure 9, it will be noted that the rail 10 where it terminates is bounded by a vertical plane 62 at the lower portion thereof and by an inclined plane 63 at the upper portion thereof and that the joint 25 is similarly bounded. This is provided in order that the joint may be raised and lowered without interference.

It will be understood that whereas I have shown and described an operative device, still many changes might be made in the size, shape, arrangement and disposition of parts without departing materially from the spirit of my invention. I wish, therefore, that my showing be taken as in a broad sense diagrammatic and illustrative, rather than as limiting me to my precise showing.

In Figures 11 and 12 I illustrate a modified form of the device which does not involve any pivotal movement of the joint; thus the device may be used where vertical clearance is limited. In this modified form, 100 indicates the turntable track rail. It rests on the plate 101 being held thereon by the integral webbed angular member 102, tie plate 103 and track bolts 104. The rail 100 extends beyond the member 102 and is laterally bent as indicated at 105. The flange of the rail is cut-away at 106, and there projects upwardly from the plate 101 a T member or gib 107.

The ground rail 108 terminates at the ground track plate 109 being in alignment with the wheel supporting rail-like member 110 and held in position with respect thereto by tie plate 111 and track bolts 112. The turntable is adapted to be moved to bring the track 100 into alignment with the wheel supporting member 110 as indicated in Figure 11. The wheel supporting member 110 is bounded at one end by inclined vertical surface 113, complementary to the inclined vertical surface 114 on the side of the bent portion 105 of the rail 100. 115 indicates the joint which interlocks with the gib 107 as indicated in Figure 12 and may travel longitudinally along that gib under influence of the connecting rod 121 operated by any suitable source of power. The joint 115 is laterally extended as indicated in Figure 11 adapted to be supported both on the plate 101 and the plate 109 to bridge the gap between the two plates, and both the rails which it is enabled to do because it has upwardly extending wheel supporting element 116 bounded by inclined vertical surfaces 117 and 118 adapted to be thrust into opposition with the surfaces 113 and 114 to permit travel of a railroad ground wheel along the rails with the flange on the gauge side 120. 119 is a reinforcing and guiding flange extending upwardly from the joint in opposition to the gauge side of the rails to assist in guiding the wheel as it travels to or from the turntable.

Movement of the joint to the left in Figure 11 and imparted tension applied to the connecting rod 121 will cause the joint to disengage from the surfaces 114 and 113 and from its contact with the ground plate 109. When the joint has been withdrawn far enough, the joint entirely clears the ground tracks, and the turntable may be rotated without interference.

The use and operation of my device are as follows:

When it is desired to move a locomotive or car onto or off of the turntable, the turntable is rotated about its center of rotation until the track is in general alignment with a selected ground track. Meanwhile the joints are in the elevated open position shown in Figure 10. Power is then applied to the connecting rod 60 to rotate the joint associated with each track rail into the closed position. The inclined terminal surfaces on the two joints engage the inclined terminal surfaces on the rail members integral with the ground rail plate and interlocking as they do, they insure positive alignment of the two rails. When the locomotive or car is run onto or off of the turntable, the wheels are supported by the bearing surface 35 as they pass the gap between the surfaces 36, 37 the bearing surface 34 as they pass from the edge of the turntable to the edge of the pit and since the division between the surfaces 41 and 57 is an inclined division, there is no drop between those surfaces. They act in the usual manner. The result is that the locomotive or car travels smoothly and easily onto and off of the turntable.

There is always a tendency for a certain amount of shock when a locomotive moves from the flexible movable turntable to track rails supported on the ground. The fact that the adjacent rails of each successive track are bound together by the integral track plate with its integral rail structure substantially increases the strength of the entire assembly so that any impact or shock is absorbed by the large massive castings at each rail end and movement or displacement of rails or rail plate is minimized by the fact that two rails terminate at each ground rail plate.

While I have illustrated my invention in connection with a locomotive turntable, it will be obvious that much, if not all of my structure could equally well be used in connection with a transfer table where instead of tracks converging on a center, the ground tracks are parallel and the transfer table with its track moves in a path at right angles to the ground tracks.

I claim:

1. For use with railroad turntables and the like in combination, a track plate having adjacent one end, an integral upwardly extending rail engaging member, the contour of which is generally the same as a rail tie bar, adapted to overlie the flange and engage the web and head of a track rail, two parallel flanges extending upwardly from the plate adjacent the other end thereof, the distance between them being greater than the width of a track rail flange, a rail bolted to the first-mentioned upward extension between the parallel flanges, a rail frog adapted to extend in general alignment with the track rail, having a bifurcated end adapted to straddle the end of the track rail, a pivot pin extending through the parallel flanges, the bifurcated ends of the frog and the rail web.

2. For use with railroad turntables and the like in combination, a track plate having adjacent one end, an integral upwardly extending rail engaging member, the contour of which is generally the same as a rail tie bar, adapted to overlie the flange and engage the web and head of a track rail, two parallel flanges extending upwardly from the plate adjacent the other end thereof, the distance between them being greater than the width of a track rail flange, a rail bolted to the first-mentioned upward extension and terminating between the parallel flanges, a rail frog adapted to extend in general alignment with the track rail, having a bifurcated end adapted to straddle the end of the track rail, a pivot pin extending through the parallel flanges, the bifurcated ends of the frog and the rail web, the distance between the bifurcated frog ends being substantially the width of the rail head, the bifurcated frog ends being adapted to rest on the opposite sides of the rail flange, one of the bifurcated ends being entirely below the rail head, the other end extending upwardly alongside of the rail head adjacent the wheel carrying surface thereof.

3. For use with railroad turntables and the like in combination, a track plate, two parallel flanges extending upwardly from the plate adjacent the other end thereof, the distance between them being greater than the width of a track rail flange, a rail bolted to the first-mentioned upward extension and terminating between the parallel flanges, a rail frog adapted to extend in general alignment with the track rail, having a bifurcated end adapted to straddle the end of the track rail, a pivot pin extending through the parallel flanges, the bifurcated ends of the frog and the rail web.

4. For use with railroad turntables and the like in combination, a track plate, two parallel flanges extending upwardly from the plate adjacent the other end thereof, the distance between them being greater than the width of a track rail flange, a rail bolted to the first-mentioned upward extension and terminating between the parallel flanges, a rail frog adapted to extend in general alignment with the track rail, having a bifurcated end adapted to straddle the end of the track rail, a pivot pin extending through the parallel flanges, the bifurcated ends of the frog and the rail web, the distance between the bifurcated frog ends being substantially the width of the rail head, the bifurcated frog ends being adapted to rest on opposite sides of the rail flange, one of the bifurcated ends being entirely below the rail head, the other end extending upwardly alongside of the rail head adjacent the wheel carrying surface thereof.

5. For use in connection with railroad turntables and the like, a supporting plate having a pair of inclined upwardly projecting track-like elements, intersecting and joined adjacent one edge of the plate, each of said elements being bounded by a generally vertical diagonal plane surface, the two surfaces if extended intersecting beyond the plate, the free ends of the upwardly extending members being shaped to conform to the contour of the track rail, a track rail abutting each such shaped end and track plates and track bolts holding each track rail in alignment with one of said elements.

6. In combination, a turntable having a pair of parallel track rails thereon, a frog associated with and adapted to project beyond each track rail, and mounted for rotary movement about a horizontal axis perpendicular thereto, each frog being bounded at its outer end by a vertically inclined diagonal surface intersecting the rail axis and located on the side of the frog furthest from the other frog, a pair of abutment plates on the ground adjacent the periphery of the turntable, each having an upwardly extended stop member bounded by a vertically inclined surface in opposition to the inclined surfaces on the frogs, a pair of parallel track rails, one rigidly attached to each of the abutment plates, and in continuation of the track-like portion thereof, an inclined track rail rigidly attached to each of the plates diverging from the point of attachment of the parallel track rail on each plate.

WILLIAM A. SUMMERHAYS.

REFERENCES CITED

The following references are of record in the file of this patent:

UNITED STATES PATENTS

| Number | Name | Date |
|---|---|---|
| 369,527 | Inloes et al. | Sept. 6, 1887 |
| 756,651 | Kelly | Apr. 5, 1904 |
| 1,077,253 | Bohannan et al. | Nov. 4, 1913 |
| 1,094,026 | Simmonds | Apr. 21, 1914 |
| 1,122,144 | Meikle | Dec. 22, 1914 |
| 1,590,534 | Mader | June 29, 1926 |
| 2,067,695 | Conley | Jan. 12, 1937 |